United States Patent

Lynch et al.

[11] Patent Number: 6,016,532
[45] Date of Patent: *Jan. 18, 2000

[54] METHOD FOR HANDLING DATA CACHE MISSES USING HELP INSTRUCTIONS

[75] Inventors: William L. Lynch, La Honda; Gary R. Lauterbach, Los Altos, both of Calif.

[73] Assignee: Sun Microsystems, Inc., Palo Alto, Calif.

[*] Notice: This patent is subject to a terminal disclaimer.

[21] Appl. No.: 08/884,066

[22] Filed: Jun. 27, 1997

[51] Int. Cl.[7] .................................................. G06F 17/30
[52] U.S. Cl. ........................... 711/118; 711/141; 712/123; 395/800.32
[58] Field of Search ........................... 707/102; 364/238; 395/460, 800.32; 711/118, 141; 712/123

[56] References Cited

U.S. PATENT DOCUMENTS

| | | | |
|---|---|---|---|
| 4,884,197 | 11/1989 | Sachs et al. ............................. | 364/200 |
| 5,197,144 | 3/1993 | Edenfield et al. ...................... | 395/425 |
| 5,291,586 | 3/1994 | Jen et al. . | |
| 5,410,682 | 4/1995 | Sites et al. . | |
| 5,524,263 | 6/1996 | Griffith et al. .......................... | 395/800 |
| 5,526,510 | 6/1996 | Akkary et al. .......................... | 395/460 |
| 5,551,005 | 8/1996 | Sarangdhar et al. ................... | 395/472 |
| 5,761,712 | 6/1998 | Tran et al. .............................. | 711/126 |
| 5,761,713 | 6/1998 | Lesarte . | |
| 5,878,252 | 3/1999 | Lynch et al. ........................... | 712/225 |

OTHER PUBLICATIONS

Chang, et al., "Microarchitecture of HaL's Memory Management Unit," IEEE Computer Society Press, 1995, pp. 272–280.

Chi-Hung Chi et al., "Reducing Memory Latency Using A Small Software Driven Array Cache," IEEE Computer Society Press, 1995, pp. 202–210, vol. 1.

Pawlovsky, et al., "A Concurrent Fault Detection Method For Superscalar Processors," IEEE Computer Society Press, 1992, pp. 139–144.

Quinones, "The NS32605 Cache Controller," IEEE Computer Society Press, 1997, pp. 218–222.

Patterson et al., *Computer Architecture: A Quantitative Approach*, Morgan Kaufman Publishers, 1990, pp. 208–214, 228–243.

*Primary Examiner*—Paul R. Lintz
*Assistant Examiner*—Jean Bolte Flelirantin
*Attorney, Agent, or Firm*—Conley, Rose & Tayon; Lawrence J. Merkel; B. Noel Kivlin

[57] ABSTRACT

A microprocessor is configured to generate help instructions in response to a data cache miss. The help instructions flow through the instruction processing pipeline of the microprocessor in a fashion similar to the instruction which caused the miss (the "miss instruction"). The help instructions use the source operands of the miss instruction to form the miss address, thereby providing the fill address using the same elements which are used to calculate cache access addresses. In one embodiment, a fill help instruction and a bypass help instruction are generated. The fill help instruction provides the input address to the data cache during the clock cycle in which the fill data arrives. The appropriate row of the data cache is thereby selected for storing the fill data. The bypass help instruction is dispatched to arrive in a second pipeline stage different from the stage occupied by the fill help instruction. The bypass help instruction causes the datum requested by the miss instruction to be forwarded to the destination of the miss instruction.

26 Claims, 5 Drawing Sheets

6,016,532

METHOD FOR HANDLING DATA CACHE MISSES USING HELP INSTRUCTIONS

BACKGROUND OF THE INVENTION

1. Field of the Invention

This invention relates to the field of microprocessors and, more particularly, to data caches within microprocessors.

2. Description of the Related Art

Superscalar microprocessors achieve high performance by executing multiple instructions per clock cycle and by choosing the shortest possible clock cycle consistent with the design. Superpipelined microprocessor designs, on the other hand, divide instruction execution into a large number of subtasks which can be performed quickly, and assign pipeline stages to each subtask. An extremely short clock cycle is the goal of superpipelined designs. By overlapping the execution of many instructions within the pipeline, superpipelined microprocessors attempt to achieve high performance. Many microprocessor designs employ a combination of superscalar and superpipeline techniques to achieve performance goals.

As used herein, the term "clock cycle" refers to an interval of time accorded to various stages of a pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. Generally, a pipeline comprises a plurality of pipeline stages. Each pipeline stage is configured to perform an operation assigned to that stage upon a value while other pipeline stages independently operate upon other values. When a value exits the pipeline, the function employed as the sum of the operations of each pipeline stage is complete. For example, an "instruction processing pipeline" is a pipeline employed to process instructions in a pipelined fashion. Although the instruction processing pipeline may be divided into any number of stages at which portions of instruction processing are performed, instruction processing generally comprises fetching the instruction, decoding the instruction, executing the instruction, and storing the execution results in the destination identified by the instruction.

A short clock cycle (i.e. a high frequency of operation) is a goal of microprocessor designs employing superscalar, superpipelined, or both superscalar and superpipelined techniques. A first microprocessor having a higher frequency than a second microprocessor is more likely, when employed in a given computer system, to achieve high performance. High performance computer systems may be more desirable than low performance computer systems in many situations.

The clock cycle time achieved by a microprocessor is determined in large part by the pipeline stage which exhibits the longest "path" (e.g. number of logic levels between the storage devices which delimit the pipeline stage). The longest path is often referred to as the "critical path". The amount of time which expires between application of a signal at the input to the critical path and a corresponding output appearing at the output of the critical path limits the clock cycle at which the microprocessor can operate.

A path which is often one of the critical paths in a microprocessor is the cache access path. Microprocessors often employ caches to reduce the amount of external memory bandwidth needed to support high performance of the microprocessor. The cache provides rapid access to the microprocessor for a subset of the data stored in main memory. The subset of data is typically the data most recently accessed by the microprocessor. Generally, a cache stores data in units of cache lines. If a datum requested by the processor is not stored within the cache (a "cache miss"), then the cache line including the requested datum is transferred from memory into the cache. A previously stored cache line may be discarded in order to allocate storage for the missing cache line. Generally, cache lines are aligned to a boundary defined by the number of bytes within the cache line. For example, a 32 byte cache line is aligned to a 32 byte boundary within the memory space. The first cache line within the memory space includes the bytes between address zero and address 31 (in decimal). In other words, addresses 31 and 32 form a thirty-two byte boundary. While a requested datum being absent from the cache at the time of the request is referred to as a cache miss, finding a requested datum stored within the cache at the time of the request is referred to as a "cache hit."

Typically, the cache access path includes logic for calculating the address to be accessed and a multiplexor for selecting between the calculated address and other address sources. Particularly, the multiplexor may select a fill address corresponding to a previous cache miss when the cache line is returned from memory. While the cache access path may occur over several clock cycles, it is important for performance to reduce the cache access path to a few clock cycles as possible while still maintaining a short clock cycle. It is therefore desirable to reduce the cache access path such that it is not a critical path without increasing the number of clock cycles over which the cache access path operates.

SUMMARY OF THE INVENTION

The problems outlined above are in large part solved by a microprocessor in accordance with the present invention. The microprocessor is configured to generate help instructions in response to a data cache miss. The help instructions flow through the instruction processing pipeline of the microprocessor in a fashion similar to the instruction which caused the miss (the "miss instruction"). The help instructions use the source operands of the miss instruction to form the miss address, thereby providing the fill address using the same elements which are used to calculate cache access addresses. Advantageously, circuitry for multiplexing the fill address into the cache access path may be eliminated. The cache access path may thereby be simplified, which may allow for higher frequency operation than a cache access path which multiplexes in the fill address. In cases in which the cache access path is a critical path, a higher operating frequency may be achieved by the microprocessor. Alternatively, the cache may be made larger within the same clock cycle time, using the time saved by decreasing the cache access path.

In one embodiment, a fill help instruction and a bypass help instruction are generated. The fill help instruction provides the input address to the data cache during the clock cycle in which the fill data arrives. The appropriate row of the data cache is thereby selected for storing the fill data. The bypass help instruction is dispatched to arrive in a second pipeline stage different from the stage at which the fill help instruction arrives when the fill data arrives at the data cache, in order to bypass the data to the appropriate destination register. The bypass help instruction causes the datum requested by the miss instruction to be forwarded to the destination register of the miss instruction. Advantageously, the cache line fill and the data bypass are performed in the same clock cycle despite the location of the cache access logic and the bypass logic in different pipeline stages. Performance may be increased over an implementation which does not employ the bypass help instruction and performs bypassing from a different pipeline stage than cache access.

Broadly speaking, the present invention contemplates a method for handling a data cache miss in a microprocessor. At least one help instruction is generated in a help instruction generator within the microprocessor. The help instruction is configured to control a data cache within the microprocessor during a clock cycle in which a cache line corresponding to the data cache miss is conveyed to the data cache. The help instruction is conveyed to the data cache during the clock cycle.

BRIEF DESCRIPTION OF THE DRAWINGS

Other objects and advantages of the invention will become apparent upon reading the following detailed description and upon reference to the accompanying drawings in which.

Figure 1:
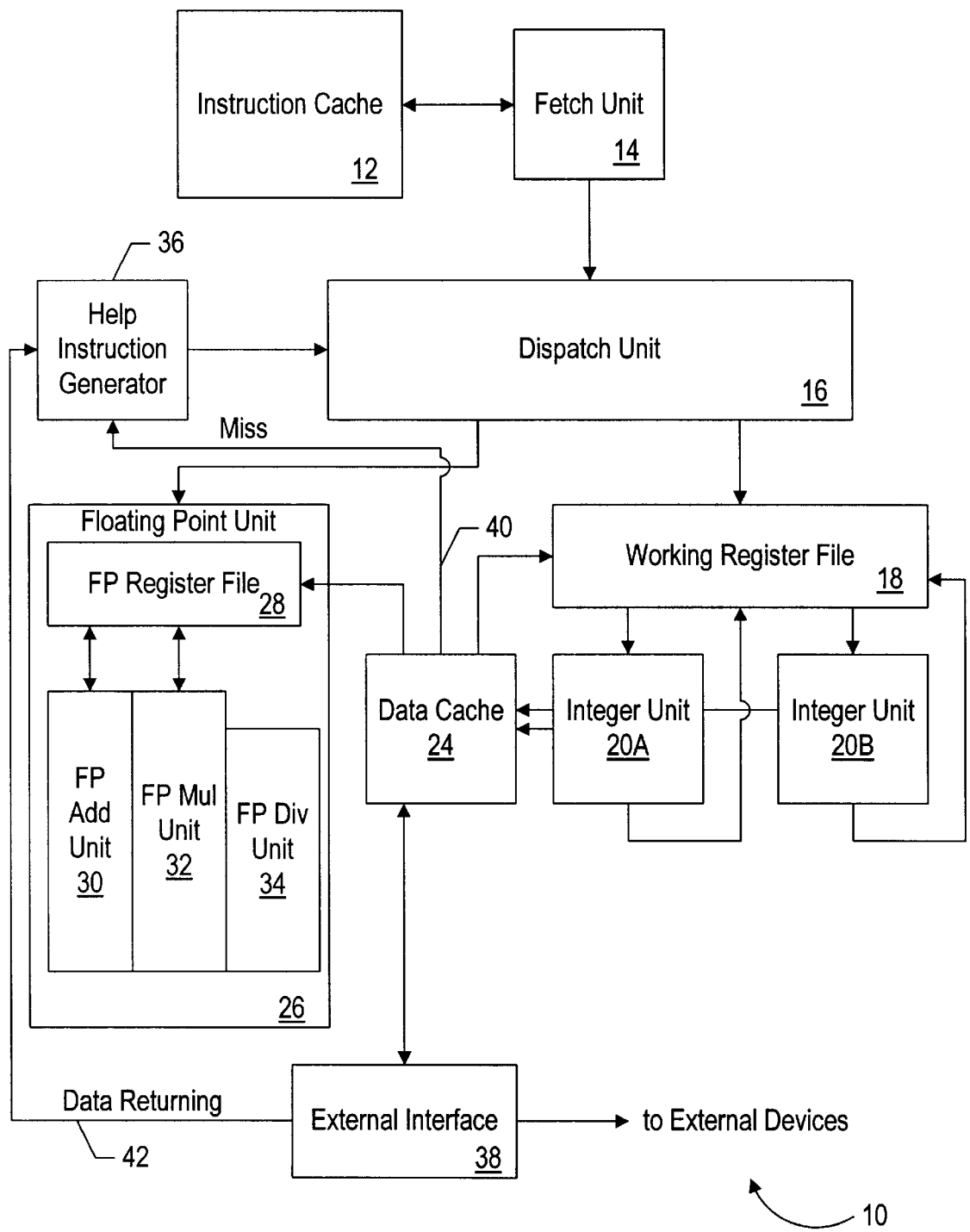
FIG. 1 is a block diagram of one embodiment of a microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. As shown in FIG. 1, microprocessor 10 includes an instruction cache 12, a fetch unit 14, a dispatch unit 16, a register file 18, a plurality of integer units 20A and 20B, a data cache 24, a floating point unit 26, a help instruction generator 36, and an external interface unit 38. Floating point unit 26 includes a floating point (FP) register file 28, an FP add unit 30, an FP multiply unit 32, and an FP divide unit 34. Instruction cache 12 is coupled to fetch unit 14, which is further coupled to dispatch unit 16. Dispatch unit 16 is in turn coupled to floating point unit 26 and register file 18, as well as to help instruction generator 36. Register file 18 is coupled to integer units 20A and 20B, which are further coupled to data cache 24. Data cache 24 is additionally coupled to FP register file 28, register file 18, and external interface unit 38. Still further, data cache 24 is coupled to help instruction generator 36 via a miss bus 40. FP register file 28 is coupled to FP add unit 30 and FP multiply unit 32. External interface unit 38 is coupled to data cache 24 and to external devices (not shown). Still further, external interface unit 38 is coupled to help instruction generator 36 via a data returning line 42.

Generally speaking, help instruction generator 36 is configured to generate one or more help instructions which control data cache 24 when a cache line fill is performed in response to a cache miss. The help instructions flow down the pipeline within microprocessor 10 in a manner similar to load/store instructions, thereby making use of the hardware within the pipelines which is used to perform data cache accesses. Multiplexing the fill address into the data cache access path may be eliminated, instead using the data cache access path and the help instruction to provide the fill address to data cache 24. Advantageously, time spent propagating through the eliminated multiplexor is removed from the data cache access path. The data cache access path is therefore shorter, and may be more suitable for a higher frequency implementation or larger cache than a data cache access path which includes the multiplexor. It is noted that, even if the multiplexor is employed for other purposes, the fill address input is removed from the multiplexor. The multiplexor may thereby operate somewhat faster due to reduced internal capacitance. Furthermore, the control logic for the multiplexor is simplified since fill operations need not factor into the control logic.

In one embodiment, data cache 24 is designed such that cache accesses are initiated in a first pipeline stage and the requested datum is forwarded from a second pipeline stage. For such an embodiment, help instruction generator 36 is configured to generate a bypass help and a fill help instruction. The bypass help instruction is dispatched to arrive at the second pipeline stage when the fill data arrives, and the fill help instruction is dispatched to arrive at the first pipeline stage when the fill data arrives. The fill help instruction is used to generate the address for data cache 24, thereby selecting a storage location within the data cache for storing the cache line (along with the selected way provided by the cache control logic). The bypass help instruction is used to provide bypass control information, including the address corresponding to the instruction which caused the cache miss and other cache access attributes.

As used herein, a "help instruction" is an instruction encoding which is in addition to the instruction encodings architecturally defined by the microprocessor architecture to which microprocessor 10 is implemented. The help instruction encodings are not available to the programmer of a computer system in which microprocessor 10 is employed, but instead are generated internally by microprocessor 10 to accomplish a specific task. The fill help and bypass help instructions, for example, are generated to cause data cache 24 to store the fill data and to cause the requested datum within the fill data to be forwarded to the destination operand of the instruction which missed data cache 24. Additionally, the term "cache access attributes" refers to characteristics in addition to the address of a load/store instruction which determine which datum is selected from the accessed cache line and the format of the datum. For example, if the accessed datum includes fewer bytes than the size of the target register, the cache access attributes may specify that the accessed datum be sign extended or zero extended to fill the target register. Also, the data format of a multiple byte datum may be specified as little endian or big endian. In little endian format, the least significant byte is stored at the lowest numerical address of the accessed bytes. On the other hand, big endian format specifies that the least significant byte is stored at the largest numerical address of the accessed bytes. In the SPARC™ architecture, an address space identifier (ASI) may specify one or more cache access attributes.

In one particular embodiment, a third pipeline stage is coupled between the first and second pipeline stages mentioned above. Help instruction generator 36 generates a no operation (NOP) instruction to fill the third pipeline stage when the fill data arrives. A NOP instruction is an instruction which does nothing. It may have no operands and no destination register, or it may perform an operation which results in no change (e.g. ORing a register operand with itself and storing the result in that register).

Data cache 24 informs help instruction generator 36 of a cache miss corresponding to a load instruction via miss bus 40. In one embodiment, store instructions which miss data cache 24 are stored directly to main memory without transferring the cache line into data cache 24. Alternatively, store miss instructions may cause a cache line fill similar to load miss instructions. Additionally transferred on miss bus 40 are the source operands of the load instruction (for forming the address when executing the help instruction), the destination operand of the load instruction (for identifying which register data is routed to in the bypass help instruction), and other cache attributes of the instruction (for selecting and formatting the data to be stored in the destination register). Additionally, data cache 24 conveys a cache line fill request to external interface unit 38.

Generally, external interface unit 38 is configured to communicate between microprocessor 10 and external devices coupled thereto. One of the external devices may be a main memory which stores instruction and data bytes. External interface unit 38 transfers cache lines which miss instruction cache 12 and data cache 24 to the respective caches, and store back data cache lines which have been modified with respect to the copy stored in the main memory. External interface unit 38 may also perform non-cache line sized transfers for store instruction which miss, for input/output (I/O) instructions, and for non-cacheable operations.

External interface unit 38 receives data in packets which are smaller than the cache line size employed by data cache 24. Additionally, the interface to external devices typically operates at a multiple of the clock cycle employed internally by microprocessor 10 in order to allow for transfers across the larger loads and longer line lengths characteristic of external connections. Therefore, external interface unit 38 can determine that the line fill data will be ready for storage into data cache 24 several clock cycles before the data actually arrives within microprocessor 10. External interface unit 38 signals (using data returning signal 42) help instruction generator 36 a predefined number of clock cycles prior to receiving the complete fill data, so that help instruction generator 36 may generate the help instructions and have them dispatched by dispatch unit 16 such that the help instructions arrive in the appropriate pipeline stages as the fill cache line data is transferred to data cache 24. The predefined number of clock cycles is determined by the number of pipeline stages between dispatch unit 16 and the pipeline stages which interact with data cache 24.

According to one embodiment, dispatch unit 16 employs an instruction queue for storing instructions provided by fetch unit 14 until these instructions can be dispatched. Dispatch unit 16, upon detection of a data cache miss, is configured to flush the instruction queue so that a predictable delay between help instruction generator 36 providing help instructions and those instructions arriving in the appropriate pipeline stages may be achieved. After receiving the help instructions from help instruction generator 36, dispatch unit 16 accepts instructions from fetch unit 14 beginning with the instruction subsequent to the load instruction which missed.

Instruction cache 12 is a high speed cache memory for storing instructions. Instruction cache 12 may be structured in any suitable manner, including set associative or direct mapped structures. In one particular embodiment, instruction cache 12 may comprise a 64 kilobyte, 4 way set associative instruction cache employing 32 byte cache lines.

Fetch unit 14 is configured to fetch instructions from instruction cache 12 and to provide the fetched instructions to dispatch unit 16. Fetch unit 14 may include branch prediction hardware in order to predict branch instructions taken or not taken. Instructions may be fetched from the predicted address and provided to dispatch unit 16. If a branch misprediction is detected, the fetched instructions are discarded and the correct instructions fetched.

Fetch unit 14 also performs predecoding upon the fetched instructions. The information generated by fetch unit 14 is used to aid dispatch unit 16 in the dispatching of instructions. For example, fetch unit 14 may identify each instruction as either a floating point instruction (for dispatch to floating point unit 26), or an integer instruction (for dispatch to integer units 20A and 20B). Additionally, fetch unit 14 may identify the precision selected by the floating point instructions. According to one embodiment, each instruction encoding indicates which precision is selected via the opcode portion of the instruction. Additional predecoding may be implemented in various embodiments as well.

Dispatch unit 16 receives instructions from fetch unit 14 and dispatches the instructions to integer units 20A–20B or floating point unit 26. Generally, dispatch unit 16 applies a set of dispatch rules to the instructions eligible for dispatch, and dispatches as many instructions as possible during each clock cycle according to the dispatch rules. In one embodiment, the dispatch rules include inhibiting dispatch of an instruction if one or more of the source operands for the instruction is dependent upon another instruction within the instruction processing pipelines of floating point unit 26 or integer units 20A–20B. Additionally, instructions are dispatched in program order. Other dispatch rules may be implemented according to design choice in various embodiments.

Register file 18 is used to store operands for reading by instructions being dispatched to integer units 20A–20B. Integer instructions are selected for dispatch by dispatch unit 16 and conveyed to register file 18, from which the operands are read. The operands and the instruction are subsequently conveyed to the integer unit 20A–20B selected by dispatch unit 18 to execute the instruction. Integer units 20A–20B employ pipelines having one or more stages for executing the instructions, after which the results are written to register file 18.

Integer units 20A and 20B may be symmetrical or asymmetrical execution units. Symmetrical execution units are configured similarly, and therefore can execute the same subset of the instructions set employed by microprocessor 10 (e.g. the integer instructions). Asymmetrical execution units employ dissimilar hardware. In this case, the combination of integer units 20A–20B include enough hardware to execute each of the integer instructions. Additionally, a dispatch rule employed by dispatch unit 16 is created in the case of asymmetrical units to ensure that each instruction is dispatched to a unit configured to execute that instruction.

Integer units 20A–20B are also configured to execute load and store memory operations in order to fetch memory operands. For example, the SPARC™ architecture defines load/store instructions. Load instructions fetch memory operands from memory and place the operands into registers for access by other instructions. Store instructions fetch register operands and store them into memory as specified by an address of a memory operand. Integer units 20A–20B access data cache 24 in order to perform memory operations. Data cache 24 is a high speed cache memory for storing data (i.e. memory operands upon which microprocessor 10 operates in response to a program being executed). Data cache 24 may employ any structure, such as a set-associative or direct-mapped structure. According to one particular embodiment, data cache 24 is a 64 kilobyte, 4 way set associative cache employing 32 byte cache lines. Data cache 24 routes memory operands read in response to load memory operations to either (i) FP register file 28 or (ii) register file 18, depending upon whether the destination operand of the load memory operation is an integer register or a floating point register.

Dispatch unit 16 dispatches floating point instructions to floating point unit (FPU) 26. The floating point instructions read operands from FP register file 28. The instructions and corresponding operands are then routed to either FP add unit 30 or FP multiply unit 32. Floating point add/subtract type instructions are executed by FP add unit 30, while floating point multiply/divide type instructions begin execution in FP multiply unit 32. Multiply operations complete within FP multiply unit 32, while floating divide and square root computations are routed to FP divide unit 34 from the first stage of the pipeline within FP multiply unit 32. Floating point divide and square root functions use more pipeline stages that multiply functions in the embodiment of FPU 26 shown in FIG. 1. Furthermore, the number of stages may vary depending upon the operands for the divide and square root instructions. Hence, the divide and square root operations are executed in the divide pipeline.

Figure 2:
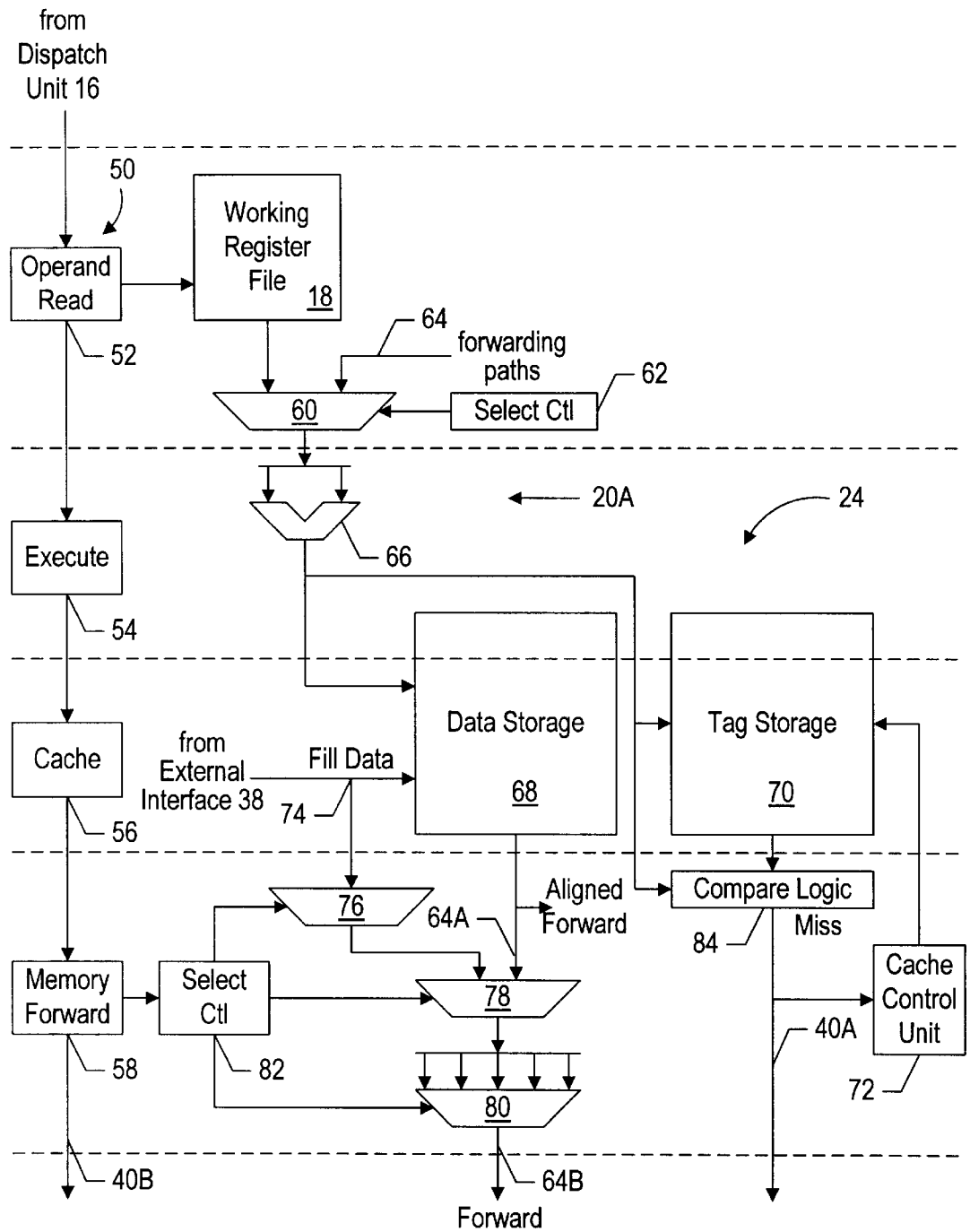
FIG. 2 is a data flow diagram of one embodiment of a portion of a pipeline employed by the microprocessor shown in FIG. 1.

Turning now to FIG. 2, a data flow diagram of a portion of a pipeline 50 employed by one embodiment of microprocessor 10 is shown. Pipeline 50 includes an operand read stage 52, an execute stage 54, a cache stage 56, and a memory forward stage 58 coupled to each other as shown in FIG. 2. Additionally shown in FIG. 2 are certain components internal to one embodiment of data cache 24 and a portion of one embodiment of integer unit 20A. According to the embodiment shown in FIG. 1, integer unit 20B is configured to execute load/store operations as well and may include a cache access path similar to the one shown in FIG. 2. Register file 18 is shown coupled to operand read stage 52 and to a multiplexor 60. Multiplexor 60 is controlled by a selection control unit 62 and is further coupled to a plurality of forwarding paths 64. Forwarding paths 64 are used to forward execution results which are concurrently being provided to register file 18 for storage, and include forwarding paths 64A and 64B from data cache 24. Multiplexor 60 is coupled to an adder circuit 66 within integer unit 20A. Adder circuit 66 is further coupled to provide a cache access address to a data storage 68 and a tag storage 70 within data cache 24. Data storage 68 is coupled to receive a cache line fill from external interface unit 38 upon a fill data bus 74, which is further coupled to a multiplexor 76. Multiplexor 76 is coupled to a multiplexor 78 to which an output of data storage 68 is coupled, and multiplexor 78 is further coupled to a multiplexor 80. Multiplexors 76, 78, and 80 are coupled to receive selection controls from a selection control unit 82 which is further coupled to memory forward stage 58. Tag storage 70 and adder circuit 66 are coupled to a compare logic block 84 which determines whether or not the cache access address hits in data cache 24. Compare logic block 84 produces a miss indication 40A (part of miss bus 40) which is provided to cache control unit 72 and to help instruction generator 36. A remaining portion of miss bus 40 is provided from memory forward stage 58 (reference numeral 40B).

A load instruction dispatched by dispatch unit 16 to integer unit 20A arrives in operand read stage 52, and the source operands are read from register file 18. The source operands are conveyed to multiplexor 60 and are selected through multiplexor 60 unless an update to one or both of the source operand registers is concurrently being provided via forwarding paths 64. In that case, that source operand is selected from forwarding paths. Multiplexor 60 provides the selected source operands to adder circuit 66, and the load instruction is transferred to execute stage 54. During execute stage 54, the cache access address corresponding to the load instruction is formed by adder circuit 66 and is provided to data storage 68, tag storage 70, and compare logic block 84. Access to data storage 68 and tag storage 70 begins in execute stage 54 and continues as the load instruction is transferred to cache stage 56. It is noted that the cache access address is provided directly by adder circuit 66 to data storage 68, etc. In other words, the multiplexor formerly used to select the fill address is not within the cache access path.

The load instruction is subsequently transferred to the memory forward stage, in which data read from data storage 68 is forwarded to register file 18. Forwarding path 64A is used if the load instruction is aligned (i.e. the cache access address is aligned to a boundary determined by the size of the registers within register file 18) and does not use any non-default cache access attributes. In one embodiment, registers are 8 bytes and a cache access address is aligned if it represents an 8 byte boundary. Additionally, in one embodiment the default cache access attributes are big endian and zero extension. If the cache access address is misaligned or uses non-default cache access attributes, the data provided by data storage 68 is provided through multiplexor 78 to multiplexor 80. Multiplexor 80 receives the data from multiplexor 78 in various orderings which support the selection of little endian data formats, various misalignments, and sign extension cache access attributes. In response to the cache access address and cache access attributes, selection control unit 82 controls multiplexor 80 to select data for forwarding upon forward path 64B. In one embodiment, data storage 68 provides eight bytes of data from the selected cache line in response to the cache access address and controls from cache control unit 72.

The help instructions flow through pipeline 50 and the data flow shown in FIG. 2 in a fashion similar to loads. The bypass help instruction is dispatched first, and the bypass help instruction arrives in memory forward stage 58 during a clock cycle in which the corresponding fill data is provided from external interface unit 38 upon fill data bus 74. The bypass help instruction includes the source operands for forming the cache access address (which is performed by adder circuit 66 as if the bypass help instruction were a load instruction), and also includes the cache access attributes of the original load instruction. These attributes and address are provided by the bypass help instruction to selection control unit 82 for controlling multiplexors 76, 78, and 80. Multiplexor 78 selects an aligned set of eight bytes out of the fill cache line in response to the cache access address, similar to the action of data storage 68. Multiplexor 78 selects the data from multiplexor 76 in response to the bypass help instruction. Multiplexor 80 operates upon the data from multiplexor 78 in a manner similar to data provided from data storage 68 in response to the cache access attributes provided by the bypass help instruction. The bypass help instruction further includes the destination operand of the load instruction, in order to forward the selected data to register file 18 for storage.

The NOP instruction is dispatched subsequent to the bypass help instruction, thereby occupying cache stage 56 during the clock cycle that the cache fill data is presented. Finally, the fill help instruction is dispatched and therefore arrives in execute stage 54 during the clock cycle that the cache fill data is presented. The fill help instruction includes the source operands of the load instruction in order to form the cache access address (similar to the bypass help instruction). Adder circuit 66 forms the address and provides the address to data storage 68, tag storage 70, and compare logic block 84. Cache control unit 72 causes data storage 68 to store the data provided upon fill data bus 74 in response to the fill help instruction. In embodiments in which data cache 24 is set associative, cache control unit 72 selects the way which is to store the fill data in accordance with a suitable cache replacement scheme. For example, a least recently used (LRU) scheme may be used.

By using both the bypass help and the fill help instructions, the data corresponding to the missing load can be forwarded and the fill data stored into the cache concurrently. If the cache access and forwarding were performed in a single clock cycle, one help instruction could be used to perform both the forwarding and fill storage functions. As another alternative, the fill help instruction could be used and the load instruction could be re-executed to forward the data. This alternative may be lower performance than using the bypass help instruction, since the forwarding is delayed with respect to the fill data being stored into the cache. However, this alternative may be desirable in cases in which bypassing the data causes a critical path in the data forwarding logic.

It is noted that, although multiplexors 76, 78, and 80 are shown separately for clarity of this description, multiplexors 76, 78, and 80 may be collapsed into a single multiplexor in one embodiment. Any selection logic which performs an equivalent function to multiplexors 76, 78, and 80 as described above may be used.

Figure 3:
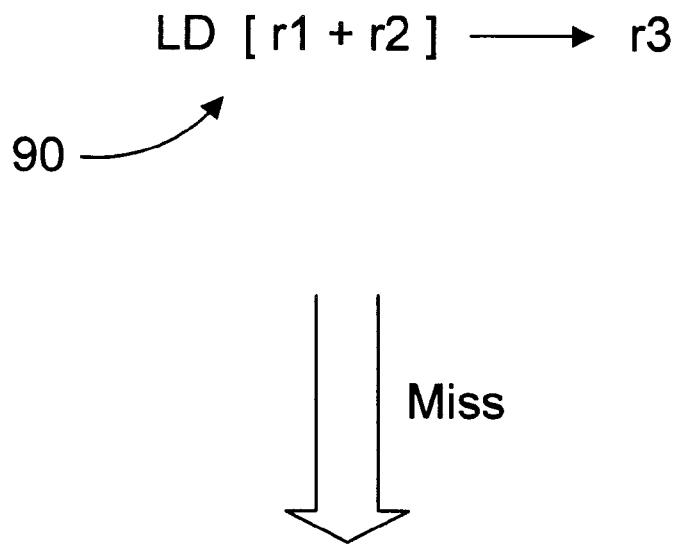
FIG. 3 illustrates a load instruction and a corresponding exemplary set of help instructions.

Turning next to FIG. 3, an exemplary load instruction 90 is shown. Load instruction 90 uses registers r1 and r2 as source operands, and stores the memory operand identified by the address formed from the source operands into register r3 (the destination operand). If load instruction 90 were to be executed and miss data cache 24, the help instructions 92, 94, and 96 are generated according to one embodiment of help instruction generator 36. Bypass help instruction 92 includes the source operands, and further includes the destination operand. Also, bypass help instruction 92 includes the cache access attributes corresponding to load instruction 90. NOP instruction 94 includes no operands or other characteristics from load instruction 90. Finally, fill help instruction 96 includes the source operands from load instruction 90. However, fill help instruction 96 does not include a destination operand (i.e. the destination operand is marked invalid). In this manner, instructions subsequent to load instruction 90 in program order have a dependency upon bypass help instruction 92 (if these instructions have r3 as a source operand). These instructions thereby receive correct operand data via the bypass path shown in FIG. 2. Additionally, instructions which use other registers do not detect a false dependency upon fill help instruction 96.

Figure 4:
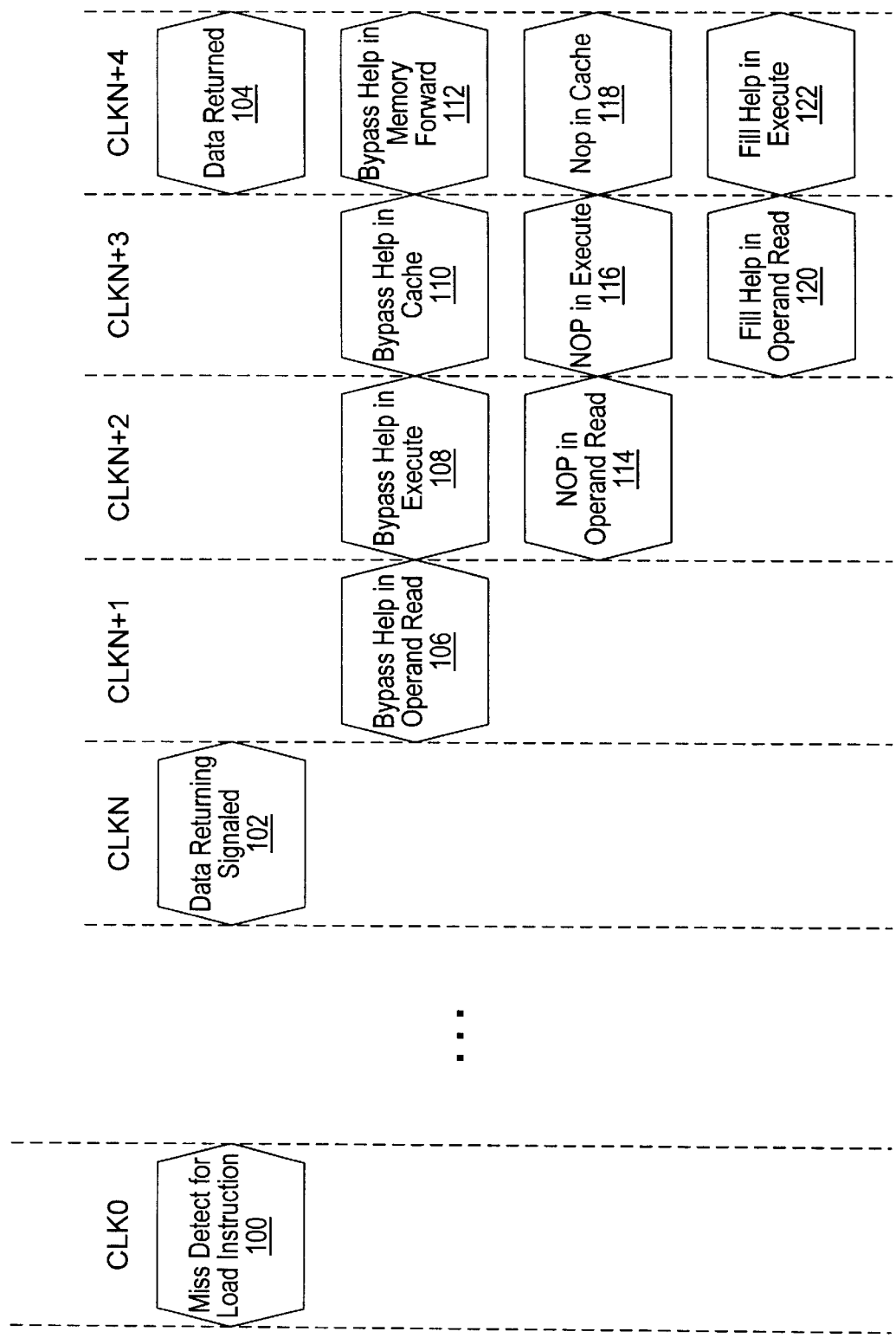
FIG. 4 is a timing diagram illustrating operation of the help instructions shown in FIG. 3.

Turning now to FIG. 4, a timing diagram is shown illustrating the operation of the help instructions shown in FIG. 3 according to one embodiment of microprocessor 10. Clock cycles are delimited by vertical dashed lines in FIG. 4, and a set of ellipses indicates the elapse of one or more clock cycles.

During clock cycle CLK0, load instruction 90 is in memory forward stage 58 and a miss is detected for the cache access address corresponding to load instruction 90 (reference numeral 100). The cache access address is provided to external interface unit 38, which initiates an access to external memory (not shown). The external memory may include one or more levels of caching as well as a main memory system. Subsequently, data begins to return to external interface unit 38 from the external memory. During a clock cycle CLKN, external interface unit 38 determines that the cache line corresponding to the cache access address will be ready for storage into data cache 24 at the expiration of the predefined number of clock cycles. According to an embodiment of microprocessor 10 employing the pipeline shown in FIG. 2, the predefined number of clock cycles is four. External interface unit 38 therefore signals help instruction generator 36 using data returning signal 42 (reference numeral 102). During clock cycle CLKN+4, the data is provided to data cache 24 via fill data bus 74 (reference numeral 104).

During clock cycle CLKN+1, the bypass help instruction is dispatched into operand read stage 52 in response to the assertion of data returning signal 42 in clock cycle CLKN (reference numeral 106). During subsequent clock cycles, the bypass help instruction passes through execute stage 54, cache stage 56, and memory forward stage 58 (reference numerals 108, 110, and 112). Additionally, the NOP instruction is dispatched during clock cycle CLKN+2 to operand read stage 52 (reference numeral 114), and subsequently propagates through execute stage 54 to cache stage 56 (reference numerals 116 and 118). Still further, the fill help instruction is dispatched to operand read stage 52 during clock cycle CLKN+3 (reference numerals 120) and propagates to execute stage 54 during clock cycle CLKN+4 (reference numeral 122).

As FIG. 4 illustrates, the fill help instruction is in execute stage 54 and the bypass help instruction is in memory forward stage 58 during clock cycle CLKN+4, which is when the fill data is provided. The requested datum is thereby forwarded and the fill data stored is thereby stored into data cache 24 without taxing the cache access path.

It is noted that the help instructions are dispatched during different clock cycles as shown in FIG. 4. The instructions might otherwise be dispatched in parallel. A dispatch rule corresponding to these help instructions is employed to prevent parallel dispatch, thereby causing each of the help instructions to be dispatched into the same pipeline. It is noted, however, that the pipeline selected for the first help instruction may be any pipeline which arrives at data cache 24 in the correct number of clock cycles.

Figure 5:
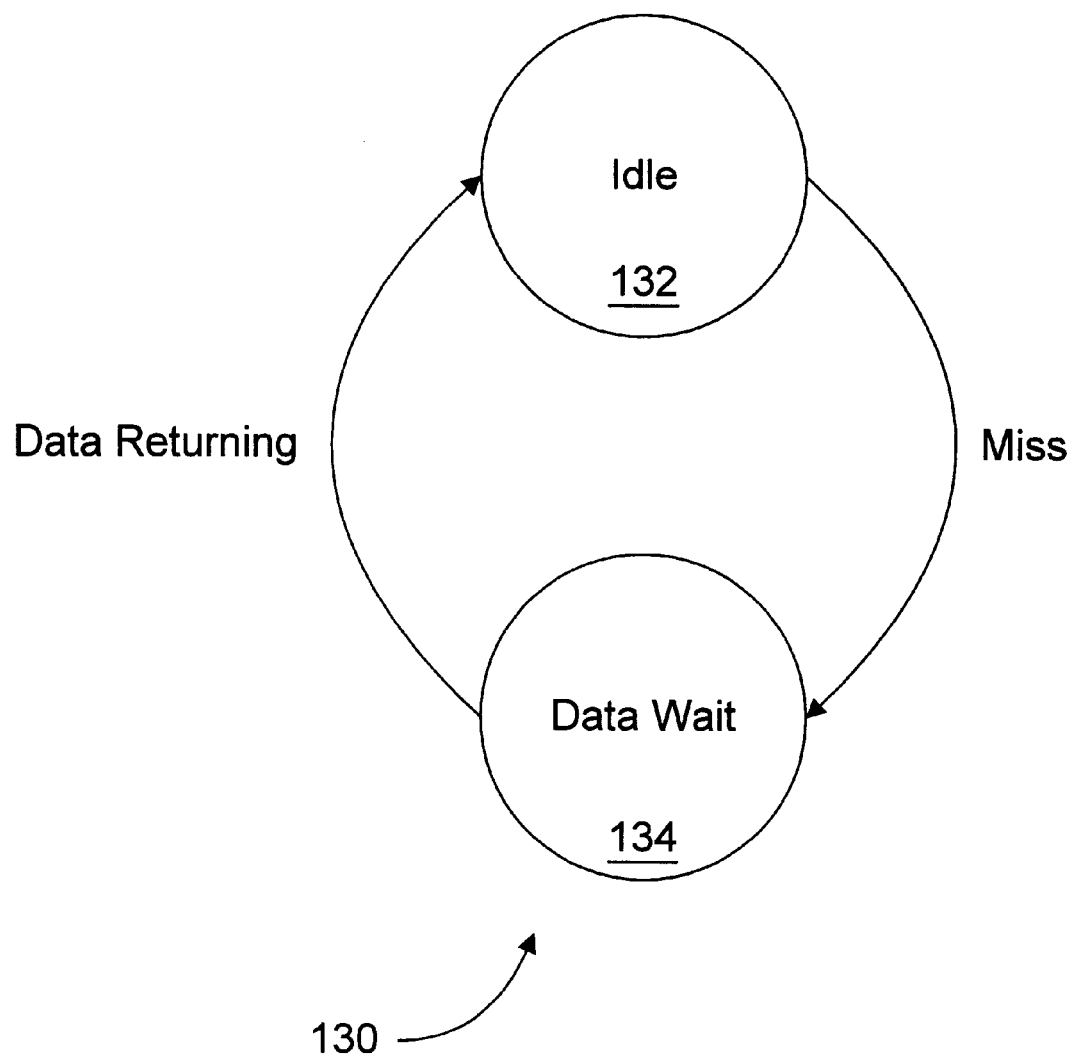
FIG. 5 is a state machine diagram for one embodiment of a help instruction generator shown in FIG. 1.

Turning now to FIG. 5, an exemplary state machine 130 is shown which may be employed by one embodiment of help instruction generator 36. State machine 130 includes an idle state 132 and a data wait state 134.

State machine 130 remains in idle state 132 until a cache miss is detected and signalled to help instruction generator 36. State machine 130 captures the cache access attributes and source and destination operands of the missing instruction for use in generating the help instructions. Additionally, state machine 130 transitions to data wait state 134 upon receiving the miss indication.

State machine 130 remains in data wait state 134 until the data returning signal is received. In response to the data returning signal, the help instructions are generated and dispatched. Additionally, state machine 130 transitions to idle state 132.

It is noted that, although help instruction generator 36 is shown receiving the data returning signal and generating the help instructions upon receipt thereof, an alternative configuration may generate the help instructions upon receipt of the miss indication. The instructions may be placed into the instruction queue of dispatch unit 16 and may be held there until data returning signal 42 is asserted. In such a configuration, data returning signal 42 is coupled to dispatch unit 16.

In accordance with the above disclosure, a microprocessor is described which employs a help instruction or instructions to perform cache line fills. The hardware employed in the cache access path may be simplified, increasing the frequency at which the cache access path may operate. Performance of the microprocessor may be increased in cases in which the cache access path is a critical path which determines the maximum frequency of operation of the microprocessor. Alternatively, performance may be improved by allowing for a larger cache to be used.

Numerous variations and modifications will become apparent to those skilled in the art once the above disclosure is fully appreciated. It is intended that the following claims be interpreted to embrace all such variations and modifications.

What is claimed is:

1. A method for handling a data cache miss in a microprocessor, comprising:

generating at least one help instruction in a help instruction generator within said microprocessor, wherein said help instruction is configured to control a data cache within said microprocessor during a clock cycle in which a cache line corresponding to said data cache miss is conveyed to said data cache; and conveying said help instruction to said data cache during said clock cycle.

2. The method as recited in claim 1 wherein said generating comprises generating a fill help instruction defined to provide an input address to said data cache.

3. The method as recited in claim 2 further comprising using said input address to select a storage location within said data cache to store said cache line.

4. The method as recited in claim 2 further comprising calculating said input address from at least one source operand of a first instruction corresponding to said data cache miss.

5. The method as recited in claim 4 wherein said generating further comprises generating a bypass help instruction configured to cause a portion of said cache line to be routed to a destination operand of said first instruction.

6. The method as recited in claim 5 further comprising selecting said portion in response to an address generated from at least one source operand of said first instruction.

7. The method as recited in claim 6 further comprising selecting said portion further in response to one or more cache access attributes corresponding to said first instruction.

8. The method as recited in claim 5 wherein said conveying comprises conveying said fill help instruction to said data cache and conveying said bypass help instruction to said data cache.

9. The method as recited in claim 8 wherein said conveying said fill help instruction comprises dispatching said fill help instruction into a pipeline coupled to said data cache.

10. The method as recited in claim 9 wherein said conveying said bypass help instruction comprises dispatching said bypass help instruction into said pipeline.

11. The method as recited in claim 10 wherein said dispatching said bypass help instruction is performed prior to said dispatching said fill help instruction.

12. The method as recited in claim 11 further comprising routing said portion of said cache line in a first pipeline stage of said pipeline in response to said bypass help instruction, wherein said first pipeline stage is subsequent to a second pipeline stage within said pipeline, and still further comprising providing said input address in said second pipeline stage in response to said fill help instruction.

13. The method as recited in claim 12 wherein said pipeline comprises a third pipeline stage coupled between said first and second pipeline stages.

14. The method as recited in claim 13 wherein said generating at least one help instruction further comprises generating a no operation (NOP) instruction.

15. The method as recited in claim 14 wherein said conveying said help instruction further comprises conveying said NOP instruction to said data cache.

16. The method as recited in claim 15 wherein said conveying said NOP instruction comprises dispatching said NOP instruction into said pipeline.

17. The method as recited in claim 16 wherein said conveying said NOP instruction is performed prior to said dispatching said fill help instruction and subsequent to said dispatching said bypass help instruction.

18. The method as recited in claim 10 wherein said dispatching said bypass help instruction is performed in response to receiving an indication that said clock cycle is to occur after a predefined number of clock cycles.

19. The method as recited in claim 18 wherein said predefined number of clock cycles is proportional to the number a number of pipeline stages within said pipeline prior to said first pipeline stage.

20. A method comprising:

dispatching a first instruction defined to access a data cache using a first address formed from one or more operands of said first instruction;

determining that said first address misses said data cache;

generating at least one help instruction responsive to said determining; and conveying said help instruction to said data cache during a clock cycle in which a cache line corresponding to said first address is conveyed to said data cache.

21. The method as recited in claim 20 wherein said generating comprises generating a fill help instruction defined to provide said first address to said data cache.

22. The method as recited in claim 21 wherein said generating further comprises generating a bypass help instruction configured to cause a portion of said cache line to be routed to a destination operand of said first instruction.

23. The method as recited in claim 22 wherein said conveying comprises:

dispatching said fill help instruction into a pipeline coupled to said data cache; and dispatching said bypass help instruction into said pipeline.

24. The method as recited in claim 23 wherein said dispatching said bypass help instruction is performed prior to said dispatching said fill help instruction.

25. The method as recited in claim 24 further comprising:

routing said portion of said cache line in a first pipeline stage of said pipeline in response to said bypass help instruction, wherein said first pipeline stage is subsequent to a second pipeline stage within said pipeline; and providing said first address in said second pipeline stage in response to said fill help instruction.

26. The method as recited in claim 23 wherein said dispatching said bypass help instruction is performed in response to receiving an indication that said clock cycle is to occur after a predefined number of clock cycles.

* * * * *